(12) United States Patent
Colgrove et al.

(10) Patent No.: US 9,262,529 B2
(45) Date of Patent: *Feb. 16, 2016

(54) SIMPLE WEB SEARCH

(71) Applicant: Palantir Technologies, Inc., Palo Alto, CA (US)

(72) Inventors: Caitlin Colgrove, Palo Alto, CA (US); Gregory Martin, Oakland, CA (US); Javier Campanini, Mountain View, CA (US)

(73) Assignee: PALANTIR TECHNOLOGIES, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/487,342

(22) Filed: Sep. 16, 2014

(65) Prior Publication Data

US 2015/0134633 A1 May 14, 2015

Related U.S. Application Data

(63) Continuation of application No. 14/077,159, filed on Nov. 11, 2013, now Pat. No. 8,868,537.

(51) Int. Cl.
*G06F 17/30* (2006.01)
*G06F 7/00* (2006.01)

(52) U.S. Cl.
CPC ...... *G06F 17/30864* (2013.01); *G06F 17/3089* (2013.01); *G06F 17/30395* (2013.01); *G06F 17/30421* (2013.01); *G06F 17/30424* (2013.01); *G06F 17/30964* (2013.01)

(58) Field of Classification Search
CPC .................. G06F 17/30395; G06F 17/30421; G06F 17/30424; G06F 17/3089; G06F 17/30964
See application file for complete search history.

(56) References Cited

U.S. PATENT DOCUMENTS 5,021,792 A 6/1991 Hwang
5,555,503 A 9/1996 Kyrtsos et al.
(Continued)

FOREIGN PATENT DOCUMENTS

EP 2400448 12/2011
EP 2816513 12/2014
WO WO 2004/038548 5/2004

OTHER PUBLICATIONS

Office Action for U.S. Appl. No. 14/077,159 dated Mar. 12, 2014.
(Continued)

*Primary Examiner* — Dung K Chau
(74) *Attorney, Agent, or Firm* — Hickman Palermo Becker Bingham, LLP; Daniel E. Miller

(57) ABSTRACT

A system of one or more computing devices is utilized for, among other purposes, creating a template-driven search interface and conducting searches thereon. In an embodiment, the system comprises: a template repository; search templates in the template repository, the search templates comprising at least: field specification data that specify search interface fields for obtaining search input data, and query specification data that specify how to generate structured queries based on the search input data obtained for the one or more of the search interface fields; a search field generator that generates search fields indicated by the field specification data; a template loading module, coupled to the template repository, that identifies available search templates in the template repository; and a search interface generator, coupled to the search field generator and template loading module, that generates different search interfaces depending on which template is selected.

20 Claims, 4 Drawing Sheets

(56) References Cited

U.S. PATENT DOCUMENTS

| | | | |
|---|---|---|---|
| 5,670,987 A | | 9/1997 | Doi et al. |
| 6,141,659 A | * | 10/2000 | Barker et al. |
| 6,189,003 B1 | * | 2/2001 | Leal |
| 6,272,489 B1 | * | 8/2001 | Rauch et al. |
| 6,642,945 B1 | | 11/2003 | Sharpe |
| 7,188,100 B2 | * | 3/2007 | De Bellis et al. ............ 707/706 |
| 7,383,053 B2 | | 6/2008 | Kent et al. |
| 7,523,100 B1 | * | 4/2009 | Bionda et al. |
| 7,529,734 B2 | * | 5/2009 | Dirisala |
| 7,652,622 B2 | | 1/2010 | Hansen et al. |
| 7,725,547 B2 | | 5/2010 | Albertson et al. |
| 7,747,648 B1 | | 6/2010 | Kraft et al. |
| 7,971,784 B2 | | 7/2011 | Lapstun et al. |
| 8,028,894 B2 | * | 10/2011 | Lapstun et al. ............... 235/375 |
| 8,285,725 B2 | | 10/2012 | Bayliss |
| 8,402,047 B1 | * | 3/2013 | Mangini et al. ............... 707/769 |
| 8,521,135 B2 | | 8/2013 | Cryderman |
| 8,739,059 B2 | | 5/2014 | Rabenold et al. |
| 8,762,870 B2 | | 6/2014 | Robotham et al. |
| 9,037,407 B2 | | 5/2015 | Thompson |
| 2003/0152277 A1 | | 8/2003 | Hall et al. |
| 2003/0227746 A1 | | 12/2003 | Sato |
| 2004/0203380 A1 | | 10/2004 | Hamdi et al. |
| 2006/0116991 A1 | | 6/2006 | Calderwood |
| 2006/0161568 A1 | | 7/2006 | Dettinger et al. |
| 2006/0206235 A1 | | 9/2006 | Shakes et al. |
| 2006/0250764 A1 | | 11/2006 | Howarth et al. |
| 2007/0043744 A1 | | 2/2007 | Carro |
| 2007/0130541 A1 | | 6/2007 | Louch et al. |
| 2007/0198571 A1 | | 8/2007 | Ferguson et al. |
| 2007/0250491 A1 | | 10/2007 | Olszak et al. |
| 2008/0007618 A1 | | 1/2008 | Yuasa |
| 2009/0005070 A1 | | 1/2009 | Forstall et al. |
| 2009/0138790 A1 | | 5/2009 | Larcheveque et al. |
| 2009/0156231 A1 | | 6/2009 | Versteeg et al. |
| 2009/0265105 A1 | | 10/2009 | Davis et al. |
| 2009/0315679 A1 | | 12/2009 | Bauchot et al. |
| 2010/0073315 A1 | | 3/2010 | Lee et al. |
| 2010/0082842 A1 | | 4/2010 | Lavrov et al. |
| 2010/0214117 A1 | | 8/2010 | Hazzani |
| 2010/0223543 A1 | | 9/2010 | Marston |
| 2010/0306713 A1 | | 12/2010 | Geisner et al. |
| 2011/0022312 A1 | | 1/2011 | McDonough et al. |
| 2011/0158469 A1 | | 6/2011 | Mastykarz |
| 2011/0202557 A1 | * | 8/2011 | Atsmon et al. ................ 707/769 |
| 2011/0310005 A1 | | 12/2011 | Chen et al. |
| 2012/0032975 A1 | | 2/2012 | Koch |
| 2012/0036434 A1 | | 2/2012 | Oberstein |
| 2012/0166929 A1 | | 6/2012 | Henderson et al. |
| 2012/0216106 A1 | | 8/2012 | Casey |
| 2012/0268269 A1 | | 10/2012 | Doyle |
| 2013/0013642 A1 | | 1/2013 | Klein et al. |
| 2013/0196614 A1 | | 8/2013 | Pahlevani |
| 2013/0226953 A1 | | 8/2013 | Markovich et al. |
| 2013/0262497 A1 | | 10/2013 | Case et al. |
| 2014/0258827 A1 | | 9/2014 | Gormish et al. |
| 2014/0302783 A1 | | 10/2014 | Aiuto et al. |
| 2014/0357299 A1 | | 12/2014 | Xu et al. |
| 2015/0080012 A1 | | 3/2015 | Sprague et al. |

OTHER PUBLICATIONS

Notice of Allowance for U.S. Appl. No. 14/077,159 dated Aug. 15, 2014.

Li et al., "Interactive Multimodal Visual Search on Mobile Device," IEEE Transactions on Multimedia, vol. 15, No. 3, dated Apr. 2013, 14 pages.

Umagandhi et al., "Search Query Recommendations Using Hybrid User Profile with Query Logs," International Journal of Computer Applications, vol. 80, No. 10, dated Oct. 2013, 12 pages.

Official Communication for New Zealand Patent Application No. 622501 dated Apr. 1, 2014.

Official Communication for New Zealand Patent Application No. 622501 dated Jun. 5, 2014.

Official Communication for European Patent Application No. 14159447.3 dated Nov. 25, 2014.

Official Communication for European Patent Application No. 14159447.3 dated Jan. 8, 2015.

Official Communication for European Patent Application No. 14189802.3, dated May 11, 2015, 8 pages.

Claims for European Patent Application No. 14189802.3, dated May 2015, 5 pages.

* cited by examiner

SIMPLE WEB SEARCH

PRIORITY CLAIM

This application claims benefit under 35 U.S.C. §120 as a Continuation of U.S. application Ser. No. 14/077,159, filed Nov. 11, 2013, the entire contents of which is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

The present invention relates to data processing techniques for conducting searches.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A search engine is a system of one or more computing devices, or components thereof, which searches one or more repositories of data for data structures that match search constraints indicated by search requests. One common type of search engine is a web search engine, which conducts searches for data structures such as web pages and other web-based documents, based on keywords and/or other constraints. However, there are many other types of search engines, and these search engines permit searches against a wide variety of repositories of data.

A search user interface, or "search interface" as abbreviated herein, is a point of interaction between an information seeker, or "user," and one or more search engines. Via the search interface, a user may submit a search request to a search engine. Via the search interface, the user may further receive information concerning one or more data structures, or "search results," that the search engine has identified as matching the search request. One common type of search interface is a web-based search interface, in which a search engine provides a web browser with a web page comprising controls via which a user may input search request parameters. Once the parameters have been entered, the user's web browser typically sends the parameters to a search engine using a request in a Hyper-Text Transfer Protocol (HTTP) or other suitable web-based protocol. The search engine then returns the search results to the browser.

Creating search interfaces is a task conventionally left to skilled programmers. For example, in the context of web-based search interfaces, creation of search interfaces conventionally requires familiarity with Hyper-Text Markup Language (HTML), JavaScript, and/or other web-based standards or tools. Search interface creation further requires knowledge of search Application Programming Interfaces (APIs), which typically vary from search engine to search engine.

SUMMARY OF THE INVENTION

The appended claims may serve to summarize the invention.

DETAILED DESCRIPTION

Figure 1:
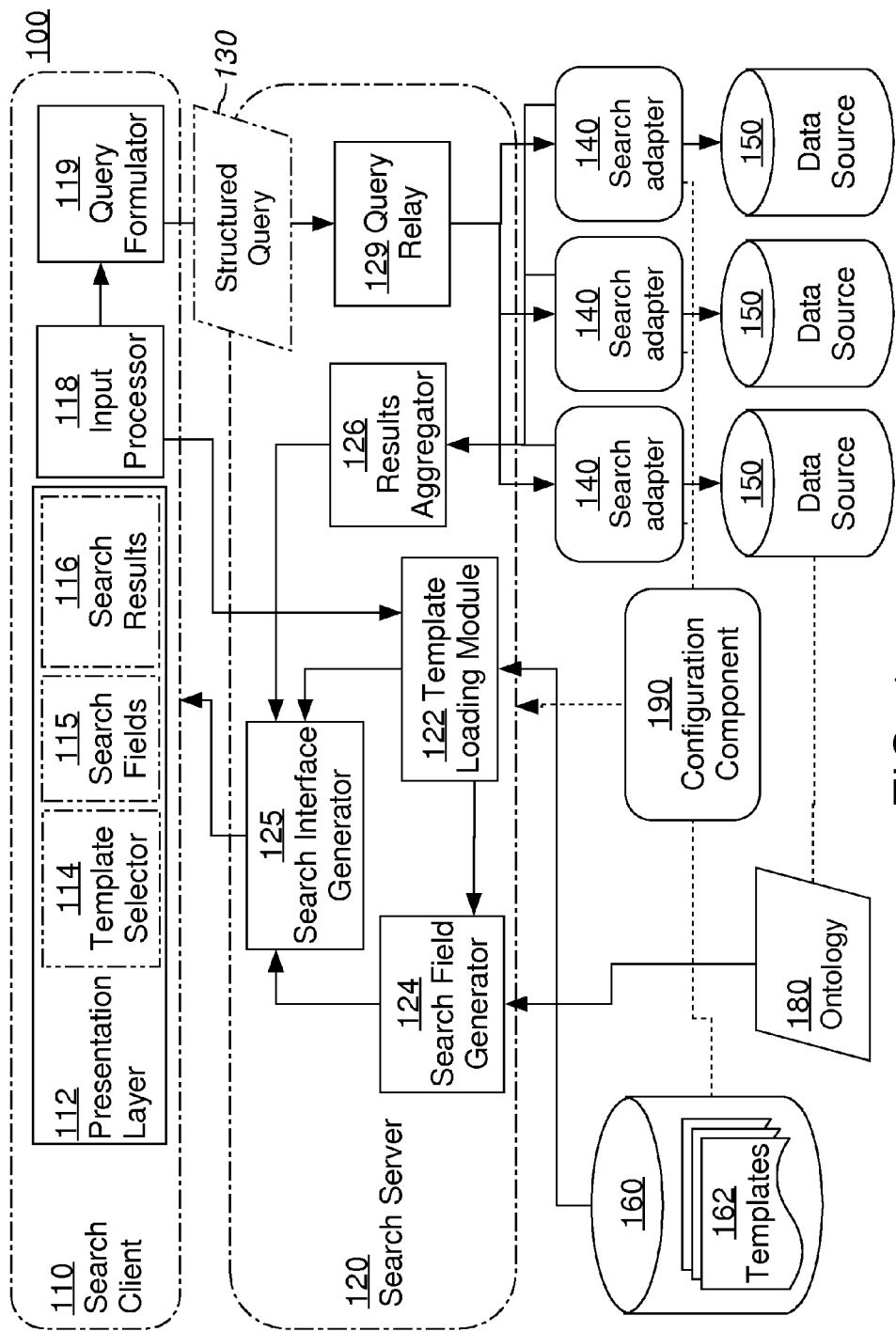
FIG. 1 illustrates an example system in which the techniques described herein may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0. General Overview

According to an embodiment, a system of one or more computing devices is utilized for, among other purposes, creating a template-driven search interface and conducting searches thereon. In an embodiment, the one or more computing devices include or are coupled to: a template repository; search templates stored in the template repository, each of the search templates comprising at least: field specification data that specify search interface fields for obtaining search input data, and query specification data that specify how to generate structured queries based on the search input data obtained for the one or more of the search interface fields; a search field generator that is configured to generate search fields indicated by the field specification data; a template loading module, coupled to the template repository, that is configured to identify one or more available search templates in the template repository; and a search interface generator, coupled to the search field generator and template loading module, that is configured to generate a search interface comprising template selection controls that are configured to select available search templates that are identified by the template loading module. The template loading module is configured to receive template selection input via the template selection controls. The search interface generator is configured to update the search interface to include particular search fields generated by the search field generator for a particular search template selected by the template selection input. The search interface is configured to receive particular search input via the particular search fields, and to cause generation of a particular structured query based on the particular search input and on particular query specification data in the particular search template.

In an embodiment, the search interface generator is configured to generate search interface provisioning instructions which, when executed by a client computing device, cause the client computing device to implement the search interface. In an embodiment, the search interface generator is further configured to send the search interface provisioning instructions to the client computing device. In an embodiment, the search interface generator is further configured to generate particular query formulation logic based on the particular query specification data, wherein the query formulation logic causes the generation of the particular structured query based on the particular search input and particular query specification data in the particular search template. The search interface generator is further configured to send the search interface provisioning instructions, including the particular query formulation logic, to the client computing device. In an embodiment, the search interface provisioning instructions include instructions for generating interface controls by which the particular search input for the particular search fields is received.

In an embodiment, the one or more computing devices comprises a plurality of search adapters that are configured to receive the structured queries, to cause searches to be conducted against a plurality of data sources based on the structured queries, and to return particular search results based on the searches. The search interface is configured to display the returned search results. In an embodiment, at least a first search adapter of the plurality of search adapters is configured to translate the particular structured query into a first query, to send the first query to a particular data source, receive first search results responsive to the first query, and to convert the first search results into a common format of the particular search results. In an embodiment, the particular template comprises data source specification data. The search interface comprises data source selection controls generated based on the data source specification data. The search interface is configured to request performing one or more searches, based on the particular structured query, against one or more particular data sources specified by data source specification input received in association with the data source selection controls.

In an embodiment, the search field generator is configured to analyze an ontology to identify properties of a data structure type specified in the field specification data, and to generate at least a first search field based at least partly upon a particular property of the identified properties. In an embodiment, the search field generator is configured to analyze an ontology to identify properties of a data structure type specified in the field specification data, and generate an interface control for defining a search filter that compares an input value to at least a particular property of the data structure type. In an embodiment, the query specification data specifies query clauses. The query clauses include at least search filter clauses and complex clauses. The search filter clauses include a first search filter clause that specifies how a first search field is compared to data structures when conducting a search. The complex clauses include a first complex clause that specifies a logical relationship between other query clauses.

According to an embodiment, a computer-implemented method comprises receiving a selection of a search template via one or more template selection controls that are configured to select from search templates for formulating searches; responsive to the selection of the search template, presenting search interface fields specified by field specification data within the search template; receiving search input via two or more of the search interface fields, the search input including first input via a first field and second input via a second field; identifying, based on query specification data within the search template, a relationship between the first input and the second input; based on the identified relationship, generating a particular query clause that includes the first input, the second input, and a search directive that indicates the identified relationship between the first input and the second input; based on the search input and the query specification data within the search template, generating a structured query based on the search input, the structured query including the particular query clause; sending the structured query to one or more search modules; and receiving search results responsive to the structured query.

In an embodiment, the method further comprises determining to which of a plurality of search modules to send the structured query based on data source specification data in the search template. In an embodiment, the method further comprises determining to which of a plurality of search modules to send the structured query based at least on third input of the search input, the third input selecting one or more controls corresponding to the one or more search modules. In an embodiment, the search directive is one of: an and directive, an or directive, an adjacent directive, or a within directive. In an embodiment, the query specification data indicates a required value for a particular search filter included in the structured query. In an embodiment, the query specification data specifies that the structured query is to include a search filter that causes the one or more search modules to execute a particular comparison operation between a particular input value for a particular field of the search interface fields and a particular data structure property of data structures that are searched. In an embodiment, the field specification data associates a particular search interface field with a particular data structure type. The method further comprises accessing ontological data to identify properties of the particular data structure type, and presenting, adjacent to the particular search interface field, controls for selecting a particular property to which corresponding input for the field is to be compared.

In an embodiment, the one or more search modules are a plurality of search modules. Each of the plurality of search modules identifies search steps to perform with respect to one or more data sources, based on the structured query. Each of the plurality of search modules generates sets of search results in a common format. The method further comprises aggregating the sets of search results as they are received from the plurality of search modules. In an embodiment, the method further comprises a first search module of the one or more search modules translating the structured query into a first query to send to a first search engine, and a second search module of the one or more search modules translating the structured query into a second query to send to a second search engine. The search results include first search results from the first search engine and second search results from the second search engine. In an embodiment, the method further comprises the first search module converting first search results from the first search engine into a common format and the second search module converting second search results from the second search engine into the common format. The search results include the converted first search results and the converted second search results.

In an embodiment, presenting search interface fields comprises sending search interface creation instructions to a search client. Identifying the relationship, generating the particular query clause, and generating the structured query comprise generating query formulation instructions based on the query specification data and sending the query formulation instructions to the search client.

2.0. Structural Overview

Embodiments provide computing devices, logic, processes and/or software organized in simplified frameworks that are useful for creating search interfaces and conducting searches. In some embodiments, the frameworks provide streamlined syntaxes and grammars for defining one or more elements of a search interface, and for formulating search requests based on inputs received in association with these elements. In some embodiments, the frameworks simplify communications with search engines by providing an intermediary translation level between the search interfaces and the search engines, thereby permitting communication with the search engines via a universal standard. In some embodiments, the frameworks include extensible programmatic interfaces by which new search engine or search interface functions can be added to the system in a modular fashion. In many cases, the frameworks reduce or eliminate the need for an intricate understating of complex coding languages or APIs when defining search interfaces, thereby allowing less-technical users and/or administrators to design and deploy customized search interfaces.

FIG. 1 illustrates an example computing system 100 in which the techniques described herein may be practiced, according to an embodiment. System 100 is a computer-based system. The components of system 100 are implemented at least partially by electronic digital hardware at one or more computing devices, such as one or more hardware processors executing program instructions stored in one or more memories and configured for performing functions described herein.

2.1. Search Server

System 100 comprises a search server 120. Search server 120 is not necessarily a search engine, but rather mediates between search clients 110 and one or more search adapters 140. In an embodiment, search server 120 comprises, among other elements, a template loading module 122, search field generator 124, search interface generator 125, results aggregator 126, and query relay component 129. These elements are described in subsequent sections.

In some embodiments, search server 120 may be a component of one or more server computing devices that are communicatively coupled to one or more client computers at which the search clients 110 are implemented. For example, search server 120 may be a web server, or an application thereof, that communicates over an intranet and/or wide area network with the client devices at which the search clients 110 are deployed. In other embodiments, search server 120 and search clients 110 are implemented at the same computing device. In some embodiments, search server 120 may further be deployed at the same computing device as some or all of search adapters 140 and/or data sources 150. In other embodiments, search server 120 is deployed at a different one or more computing devices than are search adapters 140 and data sources 150.

2.2. Templates

Search server 120 is coupled to one or more data repositories, including a repository 160 of templates 162. Search server 120 comprises a template loading module 122 that accesses and parses templates 162 in repository 160. Repository 160 and templates 162 may be any suitable data structure for storing template data. For example, repository 160 may be a file system, while templates 162 may be files within the file system. As another example, repository 160 may be a database, and templates 162 may be data structures within the database. Each template 162 may be configured to describe a different search interface that may be generated by search server 120. Thus, for example, an administrator may define new search interfaces by creating new templates 162. Templates may be formatted in any suitable coding or markup language. In an embodiment, the templates are structured according to a schema that has a more simplified and/or streamlined syntax than HTML or other common general purpose content presentation languages, to permit creation of templates without requiring the creator to learn such languages.

Templates 162 include field specification data. For example, the field specification data may include an enumerated list of input fields. The field specification data may specify a control type for each field. For example, the field specification data may specify that input for a particular field is to be collected using a specific type of graphical interface control, such as a textbox, text area, checkbox, pull-down list, and so forth. The field specification data may further indicate an order in which the controls are to be presented. The field specification data may further indicate input constraints for some or all of the identified search fields. These constraints may include an expected format or structure, such as a string, integer, date, range of numbers, and so forth. These constraints may further or alternatively specify exactly which options a user may select from, such as in a pull-down list. The field specification data may further specify default input values, search field identifiers, and/or descriptive labels.

Templates 162 may comprise query specification data, which specify how to generate a structured query based on the fields specified in the field specification data. For example, the query specification data may specify logical relationships between certain search field inputs and/or clauses based thereon. These logical operations may include conjunctive operations such as "and," "adjacent to," or "within a certain proximity," or disjunctive operations such as "or." As another example, the query specification data may specify how one or more search fields are to be compared to data structures when conducting a search. This may be done, for instance, by specifying comparison operations, such as equals, does not equal, greater than, lesser than, and so forth, to be performed between certain search field inputs and the values of certain properties of or metadata for the data structures to be searched. Or, the query specification data may indicate that a search field represents keyword(s) to be searched across all data structure elements. In some embodiments, the query specification data may be entirely separate from the field specification data. In other embodiments, some or all of the query specification data may be intermingled with the field specification data. Since different templates may have different query specification data, different types of search queries may result from two templates 162 even if their field specification data is the same.

Templates 162 may optionally include a data source specification. The data source specification identifies one or more of data sources 150 against which a search may be conducted. In an embodiment, certain data sources may be designated as required or optional.

2.3. Search Field Generator

Template loading module 122 is configured to provide search field generator 124 with the field specification data from a selected one of templates 162. Based at least partly on the field specification data, search field generator 124 identifies search fields that should be included within a search interface. The search field generator 124 then generates these search fields. Generating the search fields may comprise, for instance, generating instructions and/or data structures necessary for a search client 110 to implement search field controls for collecting input for the search fields. For example, for web-based interfaces, generating the search fields may comprise generating HTML and/or JavaScript for displaying one or more field controls within a search form. Generating the search fields for web-based interfaces may further comprise, if necessary, generating JavaScript functions for validating inputs in accordance to any specified constraints.

In an embodiment, the field specification data does not directly specify certain search fields and/or input constraints, but rather indirectly identifies certain search fields and/or input constraints by referencing metadata from an ontology 180. Ontology 180, which is optional, includes metadata that describes types of data structures to which some or all of data sources 150 provide access. Search field generator 124 is configured to utilize this metadata to identify and generate the certain search fields. In an embodiment, for example, the field specification data may specify that a separate search field be generated for each property of a referenced metadata element in ontology 180. Search field generator 124 may automatically identify these properties based on ontology 180, and generate search fields accordingly.

In an embodiment, the field specification data may indicate that the input provided for a certain search field should be subject to constraints imposed on certain predefined metadata elements. For example, the field specification data may reference a specific metadata element to indicate that input for the field be an "age," "gender," "state," or other predefined element of ontology 180. In an embodiment, search field generator 124 may even be configured to access a data source 150 described by the ontology, to determine exactly which specific values or data objects are already found in the data source for the referenced metadata element. The input may then be constrained to these specific values or data objects. The control for the certain search field may even prompt the user to select from the specific values via a pull-down menu, predictive-text textbox, or other suitable mechanism.

2.4. Interface Generator

Search interface generator 125 generates search interfaces based on templates 162, and causes search clients 110 to implement the generated search interfaces. Search interface generator 125 is configured to generate a search interface for a selected template 162 responsive to one or more types of user-initiated instructions, depending on the embodiment. For example, in an embodiment, search interface generator 162 generates a search interface responsive to a user-initiated HTTP or other web-based request from a web browser at a client device. In another embodiment, search interface generator 162 generates a search interface responsive to a local API call from a search application executing on the same computing device as search server 120. The user-initiated request may specify a search template, or a default search template may be selected.

Generating a search interface comprises generating instructions and/or data structures that a computing device may execute to implement the search interface. For example, generating a search interface may comprise generating HTML, JavaScript, and/or other suitable data structures or code that, when interpreted by a web browser, causes a client device to provide the search interface. As another example, generating a search interface may comprise generating SOAP, REST, or other suitable code for instructing a client-based application to provide the search interface. As another example, generating a search interface may comprise generating lower-level code that is directly executable by a computing device for implementing the search interface.

In an embodiment, different versions of a search interface may be generated for different search clients 110 based on the same template. For example, in an embodiment there may be different versions of a search interface targeted to search clients 110 at different web browsers. In an embodiment, there may be different versions of a search interface targeted to any combination of: one or more web browsers, one or more smartphone applications, or one or more desktop applications.

When generating a search interface, search interface generator 125 receives information included in or derived from a selected template from template loading module 122. This information includes at least the query specification data and, if specified by the template, the data source specification. Search interface generator 125 further receives the search fields generated for the selected template from search field generator 124. Based on the query specification data and the data source specification, search interface generator 125 generates query formulator instructions that instruct search clients 110 in constructing and submitting a structured query based on any input received via the search fields. For example, the query formulator instructions may be JavaScript code or other suitable instructions for executing a query formulator 119, as described in other sections.

Search interface generator 125 may further generate other search interface elements, such as a template selector or a presentation of search results, as discussed in other sections. Once all of the search interface elements are generated, search interface generator 125 sends the search interface to a requesting application and/or causes execution of the instructions for providing the search interface. The generated search interface may be, for example, an entire web page or screen window, or the generated interface may be designated portions thereof, such as a search form subsection within a web page.

2.5. Search Client

System 100 may comprise any number of search clients 110. A search client 110 implements the search interfaces generated by search interface generator 125, based on instructions and/or data structures received from search interface generator 125. Search client 110 may comprise, for instance, a generic web browser, a browser plug-in or module, a dedicated search application, or any other suitable tool for executing or interpreting the instructions and/or data structures received from search interface generator 125. Different types of search clients 110 may exist for different platforms or working environments.

Search client 110 comprises a user search interface presentation component 112. In accordance with the instructions and/or data structures received from search interface generator 125, presentation component 112 is configured to provide, or cause the provision of, a presentation of one or more textual and/or graphical elements at one or more output components, such as a computer monitor or touchscreen device. The presented textual or graphical elements include textual and/or graphical controls, such as text boxes, check boxes, buttons, and/or other graphical user interface components. Among other controls, the textual and graphical controls include template selection controls 114 and search field controls 115.

Template selection controls 114 visually guide the user in providing inputs for selecting one of templates 162. For example, the template selection controls 114 may be a pull-down list of each template 162 in repository 160. Or, the template selection controls 114 may be a pull-down list of each template 162 in repository 160 to which a user has access, as indicated by user permission data associated with templates 162 and/or data sources 150. Input selecting a specific template triggers an instruction to the search interface generator 125 to generate a new search interface based on the selected template, which results in presentation component 112 displaying a different set of textual and/or graphical elements.

Search field controls 115 visually guide the user in providing inputs for interfacing with the one or more search engines. The search field controls 115 may include a different control for some or all of the search fields identified by search field generator 124. Certain fields may be hidden from the user. These hidden fields specify search filters that should always be applied when performing a search under a corresponding search template. For example, an interface designer may wish for a certain search interface to be restricted to only certain types of data structures within a data source, or to only data structures that have a certain property value.

The presented textual or graphical elements may further include a presentation of search results 116, as described in other sections.

2.6. Collecting Input

Search client 110 further comprises an input processor 118. Input processor 118 is configured to receive inputs for fields associated with the textual and/or graphical controls presented by the presentation component 112. The inputs may be, for example, signals from one or more user-operated input devices, interpretations of these signals based on knowledge of how the textual or graphical controls are arranged, and/or derivations thereof. For example, input processor 118 may be configured to detect when a new template has been selected using template selection controls 114, and relay corresponding instructions to template loading module 122.

As another example, input processor 118 may receive inputs that specify keywords, filters, or other search parameters in association with search field controls 115. Input processor 118 is further configured to detect input instructing search client 110 to submit a search. This input may be provided in association with a "submit" control of search field controls 115. Or, certain interactions with designated search fields, such as pressing an "Enter" key while a keyword box is selected, may be interpreted as an instruction to submit a search. In an embodiment, a new search is requested any time new input is provided via search field controls 115.

2.7. Query Formulation

Input processor 118 provides the values that were input for each of search fields 115 to a query formulator 119 that corresponds to the currently selected template 162. Query formulator 119 is a set of one or more processes that generate a structured query 130 based on the inputted values, in accordance with the query formulator instructions received from search interface generator 125. Query formulator 119 may comprise, for instance, HTML form processing logic, JavaScript functions, and/or other suitable processing logic.

The structured query 130 may take a variety of forms, depending on the embodiment. For example, in an embodiment, the structured query may be a series of name-value pairs embedded within an HTTP query string or a JSON object. In an embodiment, the structured query may comprise groups of input values associated with search directives. The search directives specify relationships between the input values in a group.

In another embodiment, structured query 130 may be a hierarchical data structure comprised of clauses, in which the hierarchical relationships of the clauses reflect logical relationships between the clauses. The clauses include search filter clauses and complex clauses. Search filter clauses are generally based upon data input in association with search field controls 115, and/or data associated with hidden search fields. While query formulator 119 will often only produce one search filter clause per search field, the query formulation instructions may in some cases cause query formulator 119 to create two or more search filter clauses for a single search field. Search filter clauses may specify, without limitation, keyword input for a particular search field, a name-value pair resulting from input for a particular search field, a comparison operation between the input data of a particular search field and one or more data structures designated by the query formulation instructions, and so forth. Complex clauses comprise a search directive that specifies a conjunctive, disjunctive, or other logical relationship between two or more search filter clauses and/or other complex clauses.

2.8. Query Relay Component

Search client 110 is configured to send the structured query 130, once constructed by query formulator 119, to a query relay component 129 of search server 120. The query relay component 129 is configured to send the structured query 130 in turn to one or more search adapters 140. In an embodiment, the structured query 130 is sent to at least some of the search adapters 140 in parallel, thus potentially resulting in returning search results from two or more search adapters 140 at the same time. In an embodiment, the structured query 130 is sent serially to some or all of the search adapters 140, in that the query relay component 129 must wait for an indication that a first search adapter 140 has concluded a search before sending the structured query 130 to a second search adapter 140.

In an embodiment, the one or more search adapters 140 to which query relay component 129 sends structured query 130 is the set of all available search adapters 140. In other embodiments, the one or more search adapters 140 to which query relay component 129 sends structured query 130 are selected by data source specification data in a template 162 and/or selected by a user via controls in search client 110. One or more search adapters 140 thus selected may be identified to query relay component 129 in, for example, the structured query 130, such as in a search filter clause or in separate data source specification data. Or query relay component 129 may determine the selected one or more search adapters 140 based on metadata associated with the structured query 130, such as interface state data or session data. The selected one or more search adapters 140 may be designated directly, or by reference to a particular data source 150, depending on the embodiment.

The one or more search adapters 140 may further be implicit from one or more search parameters described in structured query 130. For example, the query relay component 129 may be configured to access ontology 180 and determine that a certain data structure type specified in the search parameters is only available in a certain data source 150 to which only a particular search adapter 140 has access. Thus, the structured query 130 is only sent to the particular search adapter 140.

In an embodiment, each of the search adapters 140 is configured to understand a common query structure. The same single structured query 130 may thus be sent to each search adapter 140, thus avoiding the need for any given search interface to have multiple query formulators in the search client 110 or search server 120.

2.9. Search Adapters

System 100 further comprises one or more search adapters 140. Each search adapter 140 searches one or more data sources 150, or causes the one or more data sources 150 to be searched. In some embodiments, search adapters 140 function as substitutes for search engines, directly conducting searches specified by structured query 130 on data sources 150 such as databases and/or file repositories. Each search adapter 140 directly generates a set of search results. This set of search results identifies data structures, in the one or more data sources 150 to which the search adapter 140 provides access, that match the parameters specified by structured query 130. The search adapter 140 provides this set of search results to results aggregator 126 of search server 120.

In other embodiments, search adapters 140 function as query translators. In these embodiments, data sources 150 are themselves search engines, each exposing a potentially different search API. Thus, search adapters 140 reconstruct the structured query 130 as a separate query for each different data source 150 to which the search adapter 140 provides access. Each separate query conforms to a potentially different syntax and grammar, corresponding to the search API of the data source 150 to which the query is targeted. Each search adapter 140 receives one or more sets of search results from the one or more data sources 150 to which the search adapter 140 provides access. The search adapter 140 converts these sets of search results into a universal search result format, and then provides a converted set of search results to results aggregator 126 of search server 120.

In some embodiments, both types of search adapters 140 may exist.

A search adapter 140 may be configured to pre-process a query and/or post-process search results using one or more rules. For example, a search adapter 140 may be configured to add additional filters or constraints to a structured query, and/or to a translated query. As another example, search adapter 140 may be configured to normalize or aggregate search results, or properties thereof. As another example, search adapter 140 may be configured to remove duplicate search results, or apply its own ranking and/or sorting logic to the search results. In an embodiment, different search adapters 140 may provide access to the same data source 150, but differ with respect to how the search adapters 140 pre-process a query or post-process search results.

In an embodiment, a search adapter 140 iteratively identifies sets of search results. For example, the search adapter 140 may initially return a first set of results that were identified most quickly, and then return additional sets of results as they are identified.

2.10. Results Aggregator

Results aggregator 126 receives sets of search results from search adapters 140. Search results may comprise actual matching data structures from data sources 150, and/or metadata describing matching data structures. In an embodiment, search adapters 140 convert or generate each search result in each set using a common search result format. For example, each search result may be a JSON object or other data structure that conforms to a common schema. As another example, each search result may be a data object identifier. However, the actual data structures represented by the search results may conform to one or many different formats, depending on the search parameters.

Results aggregator 126 may combine and/or arrange the search results from the one or more sets using any of a variety of techniques. In an embodiment, the search results are concatenated together into a single list as they are received. In another embodiment, the search results are sorted according to any of a variety of techniques, such as in numerical or alphabetical order based on a common property of the data structures that the results represent, or based on relevance metadata provided by search adapters 140. Results aggregator 126 may further post-process the search results, by for example removing duplicates, normalizing metadata within the search results, adding additional metadata, and so forth.

2.11. Presentation of Results

In the depicted embodiment, results aggregator 126 provides the aggregated search results to the search interface generator 125. Search interface generator 125 sends instructions and/or data structures to search client 110 that cause the search client to display presentations 116 of the search results. The presentations 116 of the search result may be arranged in any fashion, and may include any suitable information representative of the data structures from data sources 150 to which the search results correspond. For example, the presentations 116 of the search results may include, without limitation, one or more of: titles, names, thumbnails, maps, addresses, descriptions, or links by which actual contents of the data structure may be viewed and/or edited. In an embodiment, the information presented in presentations 116 of the search results is limited to information that was actually returned in the search results. In other embodiments, search interface generator 125 may retrieve additional information concerning certain data structures represented by certain search results directly from data sources 150. Search interface generator 125 may use any of a variety of logic to determine how best to present a given search result. For example, certain types of data structures may have predefined view templates that indicate how those structures are to be presented within a search interface.

In an embodiment, the search results are presented as a scrollable list or tile grid. In an embodiment, one or more alternate views of the search results may be available, such as map views, node-based graphs, charts of aggregated values from the search results, or other suitable data visualizations. Search client 110 may include controls for switching between views. Search interface generator 125 may also or instead be configured to identify suitable data visualizations based on search result view data in templates 162 and/or an analysis of the data structures represented by the search results.

Depending on the embodiment, search interface generator 125 may wait to send instructions to update a search interface with new search results until after search results aggregator 126 signals that all search results have been received. Or, search interface generator 125 may continually send instructions to update the search interface as results aggregator 126 continues to receive search results from the search adapters 140. In an embodiment, search interface generator 125 need not instruct search client 110 to update the entire interface, but rather instructs the search client to update a search results section.

2.12. Configuration Component

In an embodiment, system 100 optionally comprises a configuration component 190. Configuration component 190 may be as simple as a set of one or more configuration files, or the configuration component may be an actual software application. Configuration component 190 allows users and/or administrators to register the locations of one or more resources; for example, administrators may register locations of templates 162, template repository 160, search adapters 140, and/or data sources 150. Search server 120 is configured to access configuration component 190 when looking for these resources. Thus, administrators may quickly add new functions to search server 120 by registering new resources with configuration component 190.

2.13. Extensions and Variations

System 100 as shown in FIG. 1 illustrates only one of many possible arrangements of components configured to perform the functions described herein. Other arrangements may include fewer or different components, and the division of work between the components may vary depending on the arrangement.

For example, in an embodiment, results aggregator 126 or search adapters 140 may provide search results directly to the search client 110. In such embodiments, search client 110 may include or have received instructions that would cause search client 110 to aggregate search results and/or generate presentations 116 of the search results using similar techniques to those described with respect to the results aggregator 126 and search interface generator 125. The instructions may be general, or specific to a certain search template. In an embodiment, there is no aggregation of results, and the results are instead displayed separately by data source 150. Such embodiments need not necessarily require search adapters 140 to create search results in a common format. In an embodiment, results aggregator 126 may be responsible for converting search results to a common format.

In an embodiment, query formulator 119 may be deployed at the search server 120 as opposed to the search client 110. The search client 110 sends the input values directly to the search server 120. The search server 120 determines which query formulator 119 to execute based on session data indicating which search template is used by the search client 110 from which the input values are received. In an embodiment, there is no query relay 129, and search client 110 is configured to send structure query 130 directly to each selected search adapter 140.

3.0. Functional Overview

Figure 2:
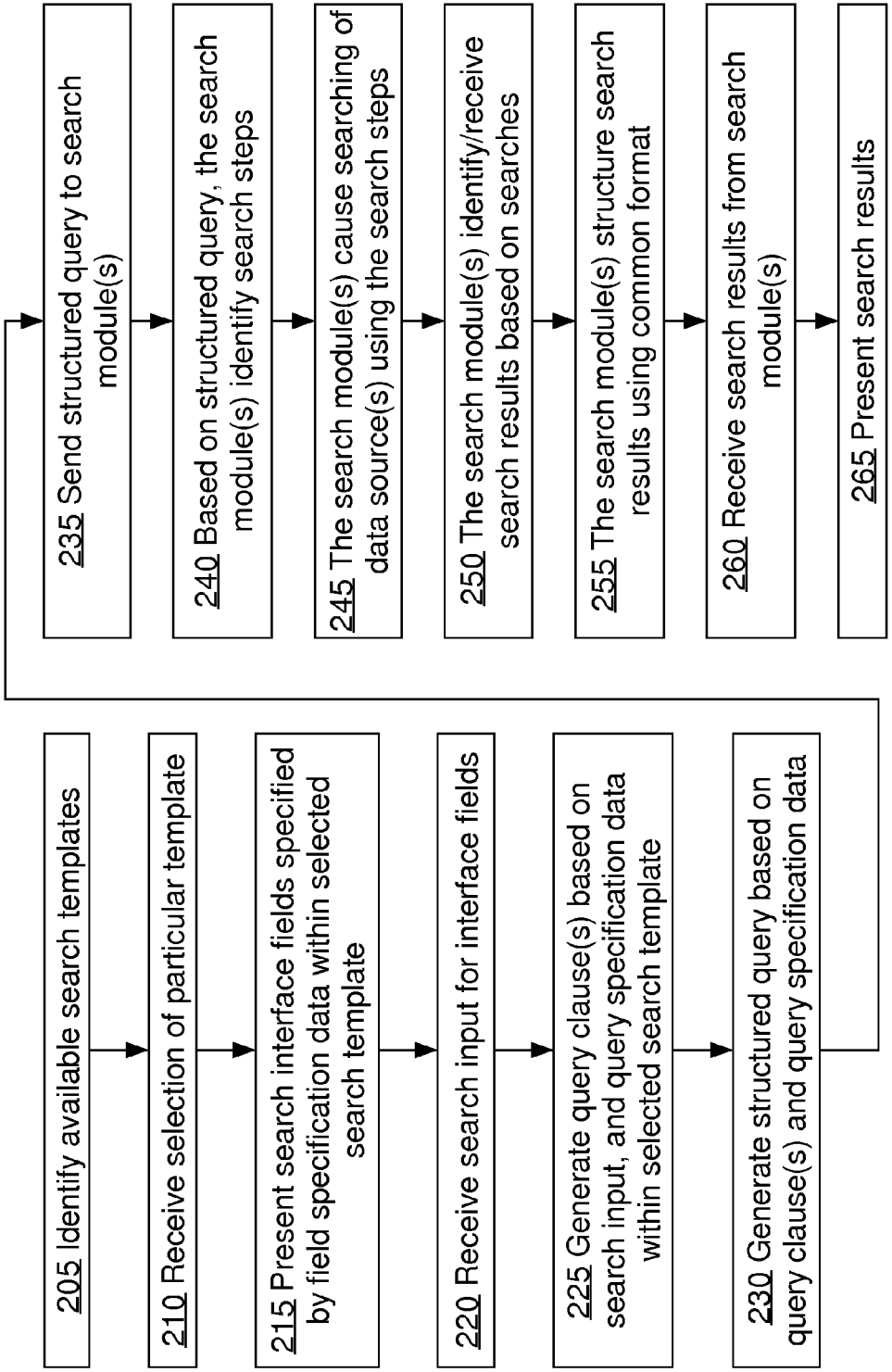
FIG. 2 illustrates a process flow for conducting a search.

FIG. 2 illustrates a process flow 200 for conducting a search. Flow 200 is but one example technique for conducting a search. Other flows may include fewer or additional elements in varying arrangements.

In an embodiment, each of the processes described in connection with the functional blocks of FIG. 2 may be implemented using one or more computer programs, other software elements, and/or digital logic in any of a general-purpose computer or a special-purpose computer, while performing data retrieval, transformation and storage operations that involve interacting with and transforming the physical state of memory of the computer. In one embodiment, flow 200 is performed by a computer system comprising, among other elements, a search client and a search server such as search client 110 and search server 120, as described in the previous section. For purposes of illustrating a clear example, the search server and search client may be described as separate and distinct components implemented by different computing devices; in other embodiments, the search server and search client may be components of a same application executing at the same computing device(s).

Block 205 comprises identifying a plurality of available search templates, for example, the search templates that have been described in the preceding sections. The identifying may comprise one or more of: accessing configuration data that specifies template locations, scanning for template files or other template structures, parsing template structures to locate template identifiers, checking user permission data with respect to the templates and/or the data sources accessed by the templates, and so forth. In an embodiment, block 205 may further comprise presenting controls to a user for selecting one of these identified search templates. However, performing such a step is not necessary in other embodiments.

Block 210 comprises receiving a selection of a particular search template from the plurality of search templates. The selection may be received via interface controls such as template selection controls 114, or the selection may be received programmatically via application logic. Receiving the selection may comprise one or more of: a search client directly receiving user input, a search server receiving an HTTP or other suitable web request, a search application receiving an API call, or a search client/server receiving any other suitable input.

Block 215 comprises, responsive to the selection of the particular search template, presenting search interface fields specified by field specification data within the selected search template, such as described in other sections. Block 215 may be performed, for instance, by creating a web page comprising a search form that includes field controls corresponding to the search interface fields, and then sending the web page to a web browser. As another example, block 215 may be performed by sending the field specification data to a standalone smartphone or desktop application that is configured to create graphical interface controls based thereon.

Block 220 comprises receiving search input for the search interface fields. The search input may comprise user-entered text and/or other user selected values, along with an indication of the search field(s) to which the input corresponds. Any suitable user input technique may be utilized in receiving the search input. Block 220 may comprise, for instance, a search client receiving input directly from a keyboard, mouse, and/or other suitable input device, and interpreting the intent of that input based on the depicted search field controls. Block 220 may further comprise, in some embodiments, a search server receiving a description of the search input from the search client.

Block 225 comprises generating one or more query clauses based on the search input, and further based on query specification data within the selected search template, as described in other sections. Block 225 may be performed, for instance, by a search client or a search server directly accessing the query specification data, and using the query specification data to determine how to generate the query clauses. In an embodiment, block 225 is performed at a search client by a query formulation component that was generated by the search server based on the query specification data in the selected search template.

The query specification data may specify, for instance, to generate keyword clause(s) based on search input corresponding to one or more keyword fields. The query specification data may further specify, for instance, to create comparison clause(s) based on search input for one or more fields associated with specific data structure properties. In an embodiment, the query specification data may specify to generate a clause that defines a relationship between a first input of the search input and a second input of the search input. The clause includes a search directive indicating the relationship. For example, the search directive may indicate that a search result must satisfy all of, at least one of, or only one of the search parameters corresponding to the first input and the second input. Or the search directive may indicate that a search result must satisfy the search parameters within a certain context, such as in adjacent or nearby terms within a same data structure property.

Block 225 may further comprise creating complex query clauses based on other query clauses, as described in other sections.

Block 230 comprises generating a structured query based on the generated query clauses and the query specification data. The structured query may be any data structure capable of describing all of the clauses, such as a JSON object.

Block 235 comprises sending the structured query to one or more search modules, such as the search adapters described in other sections and/or search engines. The search modules may be co-located with the search client and/or search server, or may be executed by one or more different computing devices. Block 235 may comprise a search client or search server sending the structured query directly to the one or more search modules. In an embodiment, block 235 may further comprise a search client sending the structured query to a search server so that the search server may send the structured query to the one or more search modules. In an embodiment, the same structured query is sent to a plurality of search modules. Block 235 may optionally comprise identifying the one or more search modules based on the selected template and/or based on data source selection input, such as described in other sections.

Block 240 comprises, based on the structured query, the one or more search modules identifying search steps to take with respect to one or more data sources. For a first type of search module, block 240 may comprise generating SQL statements, query execution plans, or other such steps that implement a process of directly searching a data repository for data structures that match the search parameters described in the structured query. For a second type of search module, whose data source(s) are search engines as opposed to other data repositories, block 240 comprises translating the structured query into a data source-specific query string or other message. The exact steps taken for a particular structured query may vary, including for search modules of the same type, depending on the data source to which a search module provides access. Both the first type of search module and the second type of search module may co-exist within certain embodiments.

Block 245 comprises the one or more search modules causing searches of the one or more data sources using the search steps. For the first type of search module, block 245 comprises actually executing the SQL statements, query execution plan, or other such steps. For the second type of search module, block 245 comprises sending the translated query to a search engine.

Block 250 comprises the one or more search modules identifying or receiving search results for the searches. The search results are, or describe, data structures within the searched data sources that match the search parameters defined by the clauses of the structured query. The first type of search module identifies the search results directly, while the second type of search module receives the search results from another search engine.

Block 255 comprises the one or more search modules structuring the search results using a common format expected by the search server and/or search client. Block 255 may be optional for some or all search modules, in that the search results received or identified by certain search modules may already be in the common format. In an embodiment, a search interface is configured to understand all possible search results that could be created by the one or more search modules, and thus block 255 is not needed even if the search results for different search modules are structured differently. Block 255 may also optionally comprise post-processing of search results.

Block 260 comprises the search server and/or search client receiving the search results from the one or more search modules. For example, block 260 may comprise the one or more search modules sending sets of search result data objects to the search server and/or the search client.

Block 265 comprises presenting the search results at the search client. For example, block 265 may comprise a search server generating HTML, JavaScript, or other suitable instructions for presenting the search results. The search server sends these instructions to a web browser at the client, which then presents the search results based thereon. As another example, block 265 may comprise the search client itself generating views of the search results returned by the one or more search adapters. For example, the search client may be an application that includes search result presentation logic. In an embodiment, block 265 comprises aggregating the search results together. However, in other embodiments, search results may be presented in separate sections. In an embodiment, block 265 is performed at least partially concurrent to blocks 250-260, in that searches may continue to run in the background as initial search results are published.

4.0. Example Search Interface

Figure 3:
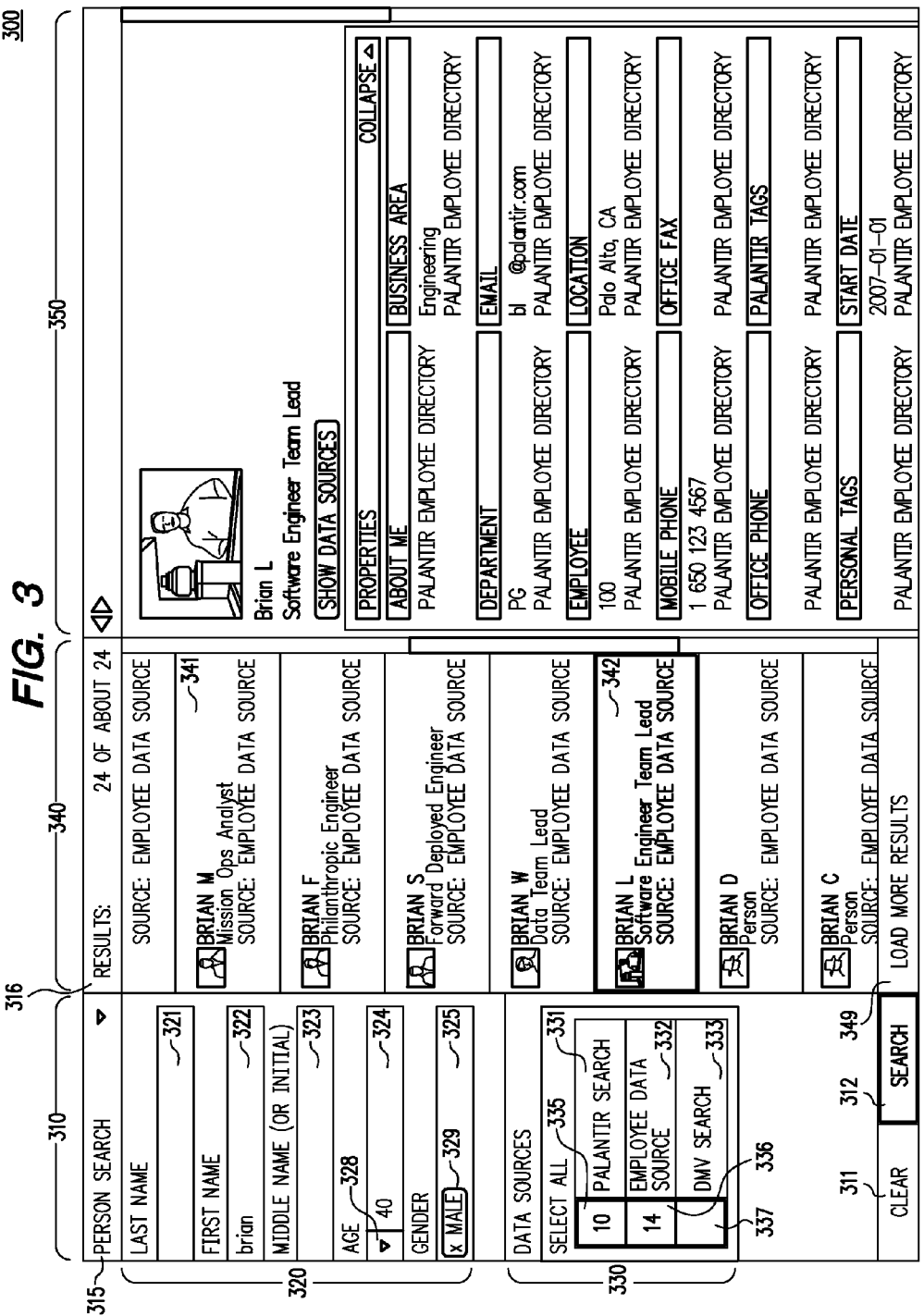
FIG. 3 illustrates an example template-based graphical user search interface.

FIG. 3 illustrates an example template-based graphical user search interface 300, according to an embodiment. Search interface 300 is one example of a search interface that may be generated using the techniques described herein and in other embodiments, search interfaces may comprise fewer or additional elements, in potentially varying arrangements.

Search interface 300 comprises a search form 310, including a template selector 315, search field area 320, and data source selection area 330. Template selector 315 names the current search template, and allows users to select a new template from a list of templates by selecting the pull-down menu control 316. Selecting a new template may result in changes to search field area 320 and data source selection area 330, depending on the search fields and/or data sources specified by the new template.

Search field area 320 comprises search field controls 321-325, each of which corresponds to a different search field identified by the currently selected template. Each of controls 321-325 includes a label to provide information to a user concerning the search field to which the respective control 321-325 corresponds. A user may specify input for a search field by entering input via a corresponding search field control 321-325. Controls 321-323 are text boxes. In some embodiments, typing into these text boxes may bring up a list of suggestions, derived from previous input associated with the template, previous input associated with similar search fields in other templates, and/or existing data within the data structure properties with which the corresponding property is to be compared. A search server or search client may be configured to automatically track such data and generate such suggestions without the suggestions having been specified in the selected template.

Control 324 may comprise a textbox that features a comparison operator selector 328. Comparison operator selector 328 is a pull-down menu that allows a user to select between comparison operators in order to specify how the inputted value of control 324 is to be compared to the values of the data structure property to which the corresponding search field is to be compared. Control 325 is a multi-value selector. Users may select multiple values by typing the values directly and/ or using a pull-down menu populated with a list of values. Each selected value will be depicted with a selected value indicator 329.

Data source selection area 330 comprises data source filter controls 331-333. Each data source filter control 331-333 corresponds to a different data source specified by the selected template, as indicated by the labels in filter controls 331-333. A user may tap or click on a control 331-333 to toggle between selecting the corresponding data source and unselecting the corresponding data source. In an embodiment, a search is only submitted for selected data sources. In another embodiment, a search is submitted for all data sources, but only search results for selected data sources are shown.

Each control 331-333 includes a status indicator 335-337 that indicates, by color or other suitable indication, whether the corresponding control 331-333 is currently selected. If a search has already been submitted, status indicators 335-337 may furthermore provide information about the data sources with respect to the search. For example, status indicators 335-337 may turn a different color or show a special graphical indicator while search results are being retrieved from a data source. Also, as depicted, status indicators 335-337 may provide an indication of a number of search results returned from a corresponding data source, and/or an indication of the quality thereof.

Search form 310 further comprises a clear control 311. User selection of clear control 311 resets all controls 321-325 and 331-333 to their default input values. Search form 310 further comprises a submit control 312. User selection of submit control 312 indicates to search interface 300 that the user has finished specifying search parameters, and wishes to retrieve search results. Both controls 311-312 are optional, depending on the environment. For example, in some embodiments, selection of a data source selection control 331-333 indicates to the search interface that the search should be sent to the corresponding data source. In other embodiments, a search is sent any time the user provides input into search form 310. Thus, for instance, the user may perceive search interface 300 as returning search results while the user is still typing in a text box 321-333.

Search interface 300 further comprises a search result area 340. Search result area 340 is a scrollable list of search results, including search results 341 and 342. Search result area 340 is initially blank, but then filled with views of search results after a search has been performed. Each search result is presented as a rectangular area within the scrollable list, and may include summary information about the data structure corresponding to the search result, such as a thumbnail, name, description, and/or other selected information. The exact information presented for each search result may vary depending on the type and/or contents of the data structure to which a search result corresponds.

In some embodiments, sets of search results are retrieved iteratively from each data source. For example, a search adapter may be configured to return a first set of high-quality or easy-to-locate search results before returning other search results. If necessary, the search adapter may continue to search for additional results even after returning the first set. In an embodiment, search result area 340 is updated to include these additional results as found. In another embodiment, the search interface must explicitly request that the search adapter continue searching and/or return the additional results. Thus, as depicted in FIG. 3, search result area 340 further includes a control 349 for retrieving additional results. The process may be repeated for any number of iterations.

Search interface 300 further includes an optional detail view area 350 that displays more information about a selected search result 342. Depending on the embodiment, the detail view area 350 may include additional information from the data structure corresponding to search result 342, including information not initially returned with the search results. For example, clicking on 342 may cause a search interface generator to perform one or more queries with respect to the corresponding data structure in order to populate a detail view template for the data structure.

In some embodiments, search results 341-342 and/or detail view area 350 may further include controls for performing actions with respect to a corresponding data structure, such as viewing or editing the complete data structure, printing the detail view, generating a data visualization based on the corresponding data structure, and so forth. Also, multiple search results may be selected from search result area 340, and one or more controls may allow for one or more actions with respect to these multiple search results. Search interface 300 may further include additional views derived from the search results, such as maps or graphs.

5.0. Example Data Structures 5.1. Example Template

According to an embodiment, a template is a data object, such as a JSON object, comprising: a URI field specifying a private identifier for the template; a name field specifying the name of the template, as seen by a user; an optional description field comprising additional information about the template; multiple field objects; an optional query object; and an optional data source object. A field object, in turn, comprises: a URI specifying a private identifier for the field; an input type, which specifies the type of input control used to collect input for the field object; a name, corresponding to the name displayed in the label for the input control; an optional default value; an optional data type; and/or an optional comparison operator. A data source object comprises a list of data sources and/or search adapters targeted by the template.

A query object comprises one or more clause objects. Example clause object types include, without limitation: an AND clause for specifying a conjunction between two or more other clauses, an OR clause for specifying a disjunction between two or more other clauses, an ObjectType clause for specifying a type of object to filter the search upon, a Keyword clause for specifying one or more keywords to filter the search upon, or a Property clause for specifying comparison operations between an input value and a particular data structure property. Each of the ObjectType, Keyword, and Property clauses includes a data field that specifies either the URI of a field object from which to retrieve input, or hard-coded data for "hidden" search parameters.

TABLE 1 illustrates an example template for generating the search interface 300 of FIG. 3, in accordance with the above-described embodiment

TABLE 1

EXAMPLE TEMPLATE

```
{
  "uri": "pt.template.person",
  "name": "Person Search",
  "fields": [
    {
      "uri":"LastName",
      "display":"Last Name",
      "inputType":"property",
      "data": {
        "typeUri":"com.palantir.property.Name",
        "componentUri":"LAST_NAME",
        "operator": "=",
      }
    },
    {
      "uri":"FirstName",
      "display":"First Name",
      "inputType":"property",
      "data": {
        "typeUri":"com.palantir.property.Name",
        "componentUri":"FIRST_NAME",
        "operator": "=",
      }
    },
    {
      "uri":"MiddleName",
      "display":"Middle Name (or Initial)",
      "inputType":"property",
      "data": {
        "typeUri":"com.palantir.property.Name",
        "componentUri":"MIDDLE_NAME",
        "operator": "=",
      }
    },
    {
      "uri":"age",
      "display":"Age",
      "inputType":"property",
      "data": {
        "typeUri":"com.palantir.property.Age",
      }
    },
    {
      "uri":"Gender",
      "display":"Gender",
      "inputType":"property",
      "data": {
        "typeUri":"com.palantir.property.Gender",
        "operator": "-",
      }
    },
  ],
  "query":{
    "type":"AND",
    "clauses":[
      {
        "type":"Property",
        "value-uri":"LastName"
      },
      {
```

TABLE 1-continued

EXAMPLE TEMPLATE

```
        "type":"Property",
        "value-uri":"FirstName"
      },
      {
        "type":"Property",
        "value-uri":"MiddleName"
      },
      {
        "type":"Property",
        "value-uri":"age"
      },
      {
        "type":"Property",
        "value-uri":"Gender"
      },
      {
        "type": "OR",
        "clauses": [
          {
            "type":"ObjectType",
            "data": {
              "value":"com.palantir.object.Person"
            }
          },
          {
            "type":"ObjectType",
            "data": {
              "value":"com.palantir.object.Entity"
            }
          }
        ]
      }
    ]
  },
  "dataSources": [
    "pt.data.palantir.structured",
    "pt.data.people",
    "pt.data.test3",
  ]
}
```

The above template specification is given by way of example. In other embodiments, templates may be structured in any number of suitable manners.

5.2. Example Structured Query

According to an embodiment, TABLE 2 illustrates an example structured query generated based on the above example template:

TABLE 2

EXAMPLE STRUCTURED QUERY

```
{
  "type":"AND",
  "clauses": [
    {
      "value-uri":"LastName",
      "data": {
        "componentUri":"LAST_NAME",
        "typeUri":"com.palantir.property.Name",
        "value":"",
        "operator":"="
      },
      "userEntered":true,
      "type":"Property"
    },
    {
      "value-uri":"FirstName",
      "data": {
        "componentUri":"FIRST_NAME",
        "typeUri":"com.palantir.property.Name",
        "value":"brian",
        "operator":"="
      },
```

TABLE 2-continued

EXAMPLE STRUCTURED QUERY

```
      "userEntered":true,
      "type":"Property"
    },
    {
      "value-uri":"MiddleName",
      "data": {
        "componentUri":"MIDDLE_NAME",
        "typeUri":"com.palantir.property.Name",
        "value":"",
        "operator":"="
      },
      "userEntered":true,
      "type":"Property"
    },
    {
      "value-uri":"age",
      "data": {
        "typeUri":"com.palantir.property.Age",
        "value":"40",
        "operator":"<"
      },
      "userEntered":true,
      "type":"Property"
    },
    { "value-uri":"Gender",
      "data": { "typeUri":"com.palantir.property.Gender",
        "value":["","MALE"],
        "operator":"="
      },
      "userEntered":true,
      "type":"Property"
    },
    {
      "type":"OR",
      "clauses": [
        {
          "data": {
            "value":"com.palantir.object.Person"
          },
          "type":"ObjectType"
        },
        {
          "data": {
            "value":"com.palantir.object.Entity"
          },
          "type":"ObjectType"
        }
      ]
    }
  ]
}
```

The above structured query definition is given by way of example. In other embodiments, queries may be structured in any number of suitable manners.

5.3. Example Search Result

TABLE 3 illustrates an example search result returned from a search adapter:

TABLE 3

EXAMPLE SEARCH RESULT

```
{
  "id": "pt.data.palantir.structured:887340230857982198",
  "simpleId": "887340230857982198",
  "title": "Brian D",
  "hasThumbnail": true,
  "description": "Person",
  "dsName": "Palantir Search",
  "dsUri": "pt.data.palantir.structured"
}
```

The example search result is used in an embodiment where generating a presentation of the search result comprises looking up additional information about the data structure referenced by the search result. In other embodiments, search results may be structured in any number of suitable manners. For example, a search result may include all information necessary to generate a presentation for the search result, such as a title, description, thumbnail link, and so forth.

6.0. Example Extensibility Features

In embodiments, new templates and/or search adapters may be made available to a search server and search client via a registration process at the search server. For example, each template and/or search adapter may be contained in a separate file. In an embodiment, the template and/or search adapter may be registered by placing the file within a certain directory on the search server. In other embodiments, the template and/or search adapter may be registered by adding the location of the file to a path statement in a configuration file that specifies templates. The search server may access this configuration file or directory to identify which templates and/or search adapters are available.

In an embodiment, each search adapter implements the same API. For example, each search adapter may be based on a coded object that inherits features and functions from a common coded object. In an embodiment, each search adapter implements a common set of API function calls, including some or all of: a function call for retrieving identifier(s) of data source(s) to which the search adapters provide access, a function call for receiving a structured query, a function call for converting the structured query API into a string-based query that conforms with the data source(s), a function for initiating a search, a function for returning a complete set of search results, or a function for returning an iterative set of search results.

7.0. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
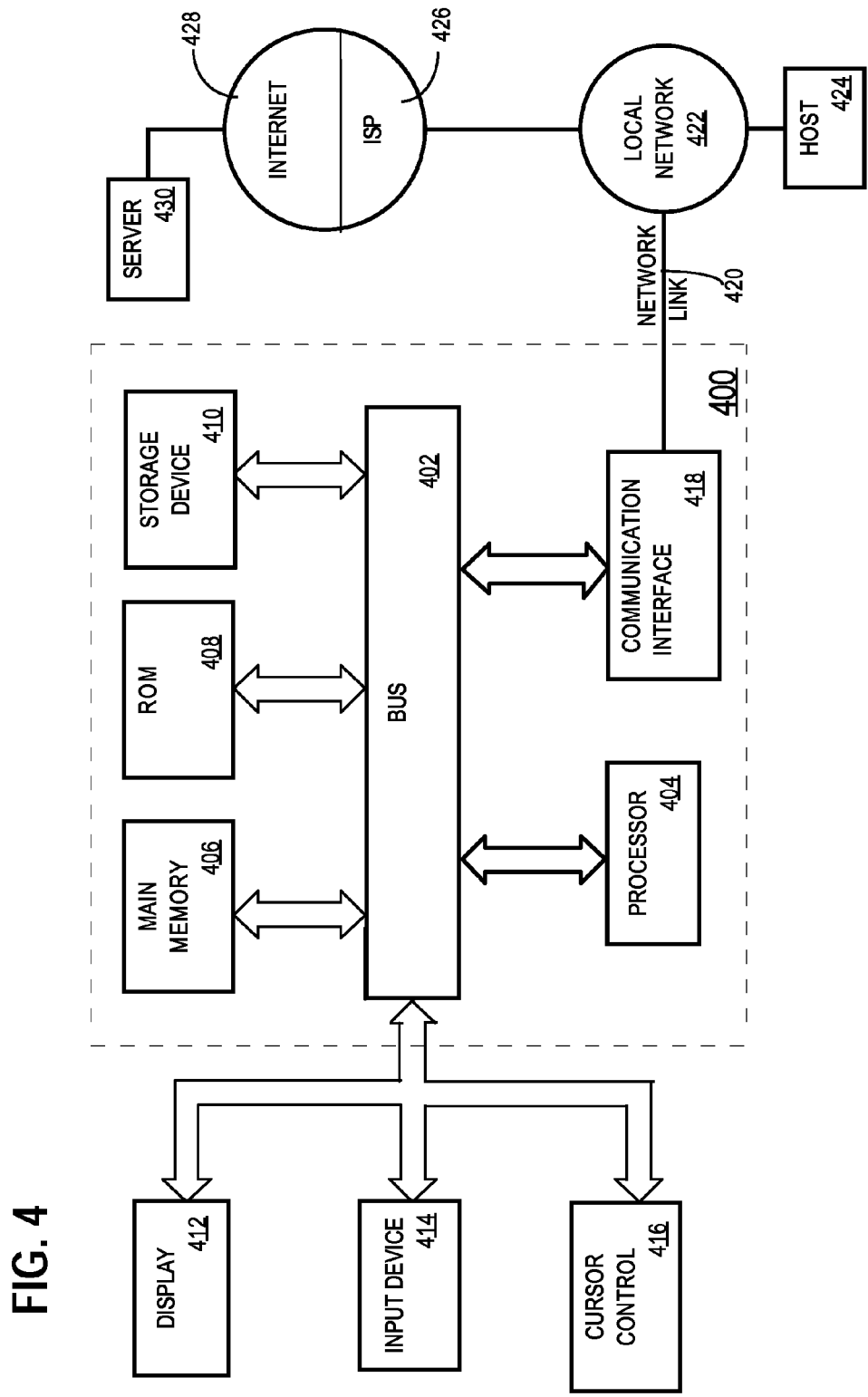
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (for example, x) and a second axis (for example, y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

One or more forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing one or more types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the one or more networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system comprising:
one or more computing devices configured to store a template repository;
search templates stored in the template repository, each of the search templates comprising at least: field specification data that specifies search interface fields for obtaining search input data, the field specification data associating at least a particular search interface field of the search interface fields with a particular data structure type;
a search field generator in the one or more computing devices, the search field generator configured to generate the search interface fields indicated by the field specification data, including the particular search interface field;
wherein the search field generator is further configured to access ontological data to automatically identify properties defined to belong to objects of the particular data structure type, and to generate, based on the identified properties, a search interface field for each property, including the particular search interface field;
a search interface generator, coupled to the search field generator, configured to generate search interfaces that include specified search interface fields for selected search templates, the specified search interface fields generated by the search field generator, wherein the search interfaces are configured to receive search inputs via their included search interface fields;
wherein the generated search interfaces include at least a particular search interface configured to receive query value input specifying a query value via the particular search interface field;
at least one query formulation component configured to generate structured queries based on the search inputs, the structured queries including a particular structured query that comprises at least a particular query clause based on to the query value input and the particular search interface field;
a query relay component that is configured to access the ontological data and determine that a certain data structure type specified in the search inputs is only accessible through one or more search modules of a plurality of search modules;
the one or more search modules, configured to receive the structured queries and cause searches to be conducted based on the structured queries, the searches including at least a particular search that involves, based on the particular query clause, comparing the query value to values for the property in the objects of the particular data structure type.

2. The system of claim 1, further comprising:
a template loading module, coupled to the template repository, that is configured to identify available search templates in the template repository;
wherein the search interface generator is further configured to include in the search interfaces template selection controls for selecting from the available search templates in the template repository;
wherein the template loading module is configured to receive template selection input via the template selection controls and load selected search templates for the search interface generator.

3. The computer system of claim 1,
wherein the search interface generator is configured to generate search interface provisioning instructions which, when executed by a client computing device, cause the client computing device to implement the search interface;
wherein the search interface generator is further configured to send the search interface provisioning instructions to the client computing device.

4. The computer system of claim 1,
wherein the one or more search modules are a plurality of search adapters that are configured to cause the searches to be conducted against a plurality of data sources based on the structured queries, and further configured to return search results based on the searches;

wherein the search interfaces are configured to present the search results.

5. The computer system of claim 1,
wherein the one or more search modules are configured to cause searches to be conducted against a plurality of data sources based on the structured queries;
wherein the ontological data includes metadata that describes types of data structures to which some or all of the plurality of data sources provide access, including the particular data structure type.

6. The computer system of claim 1, wherein the search interface generator is configured to generate a different query formulation component for each different search template in the repository based on query specification data in the search templates.

7. The system of claim 1, wherein the search field generator is further configured to access at least one data source described by the ontological data to determine specific values or objects found in the at least one data source, and to create a control in the particular search interface for selecting from the specific values or objects a particular value or object to enter as the query value input for the particular search interface field.

8. A method comprising:
generating, within a search interface, search interface fields specified by field specification data within a search template;
wherein the field specification data associates a particular search interface field of the search interface fields with a particular data structure type;
accessing ontological data to automatically identify properties defined to belong to objects of the particular data structure type;
accessing at least one data source described by the ontological data to determine specific values or objects found in the at least one data source;
generating, adjacent to the particular search interface field within the search interface, a control for selecting from the specific values or objects a particular value or object to enter as a query value input for the particular search interface field;
receiving the query value input specifying a query value via the particular search interface field from the search interface receiving an input indicating the particular value or object via the control;
generating a structured query that at least includes a particular query clause, the particular query clause generated based on the query value input, the structured query configured to, when executed by a search server, cause performance of a search that involves, based on the particular query clause, comparing the query value to values for a corresponding property in the objects of the particular data structure type;
sending the structured query to one or more search modules;
receiving search results responsive to the structured query;
wherein the method is performed by one or more computing devices.

9. The method of claim 8, further comprising:
receiving a selection of the search template from a plurality of available search templates via one or more template selection controls that are configured to select from search templates for formulating searches;
responsive to the selection of the search template, presenting the search interface fields.

10. The method of claim 8, further comprising:
generating search interface provisioning instructions which, when executed by a client computing device, cause the client computing device to display the search interface, the search interface further configured to present the received search results;
sending the search interface provisioning instructions to the client computing device.

11. The method of claim 8,
wherein the one or more search modules are a plurality of search adapters that are configured to cause the search to be conducted against a plurality of data sources based on the structured query, and further configured to return the search results;
wherein the search interface is further configured to present the search results from the plurality of data sources.

12. The method of claim 8,
wherein the one or more search modules are configured to cause the search to be conducted against a plurality of data sources based on the structured query;
wherein the ontological data includes metadata that describes types of data structures to which some or all of the plurality of data sources provide access, including the particular data structure type.

13. The method of claim 8, further comprising streaming the search results from the one or more search modules to a client computing device that is presenting the search interface as the search results are being streamed, the search interface configured to aggregate the search results as they are received.

14. One or more non-transitory computer-readable media storing instructions that, when executed by one or more computing devices, cause:
receiving an indication of a search template, the search template comprising at least: field specification data that specifies search interface fields for obtaining search input data, the field specification data associating at least a particular search interface field of the search interface fields with a particular data structure type;
accessing ontological data to automatically identify properties defined to belong to objects of the particular data structure type;
generating, based on the identified properties, a search interface field for each property, including the particular search interface field for a corresponding particular property;
generating a search interface that includes the search interface fields generated from the identified properties, wherein the search interface is configured to receive search inputs via the search interface fields;
wherein the search interface includes at least the particular search interface field configured to receive query value input specifying a query value;
receiving a query value input specifying a query value via the particular search interface field;
generating a structured query that at least includes a particular query clause, the particular query clause generated based on the query value input and the particular search interface field, the structured query configured to, when executed by a search server, cause performance of a search that involves, based on the particular query clause, comparing the query value to values for a corresponding particular property in the objects of the particular data structure type;

sending the structured query to one or more search modules;

receiving search results responsive to the structured query.

15. The one or more non-transitory computer-readable media of claim 14, wherein the instructions, when executed by one or more computing devices, further cause:

receiving a selection of the search template from a plurality of available search templates via one or more template selection controls that are configured to select from search templates for formulating searches;

responsive to the selection of the search template, presenting the search interface fields.

16. The one or more non-transitory computer-readable media of claim 14, wherein the instructions, when executed by one or more computing devices, further cause: presenting the received search results in the search interface.

17. The one or more non-transitory computer-readable media of claim 14, wherein the one or more search modules are a plurality of search adapters that are configured to cause the search to be conducted against a plurality of data sources based on the structured query, and further configured to return the search results;

wherein the instructions, when executed by one or more computing devices, further cause: presenting the search results from the plurality of data sources.

18. The one or more non-transitory computer-readable media of claim 14:

wherein the one or more search modules are configured to cause the search to be conducted against a plurality of data sources based on the structured query;

wherein the ontological data includes metadata that describes types of data structures to which some or all of the plurality of data sources provide access, including the particular data structure type.

19. The one or more non-transitory computer-readable media of claim 14, wherein the instructions, when executed by one or more computing devices, further cause:

receiving one or more streams of the search results from the one or more search modules;

aggregate the search results and presenting the aggregated search results as they are being received in the one or more streams.

20. The non-transitory computer readable media of claim 14, further comprising instructions for: accessing at least one data source described by the ontological data to determine specific values or objects found in the at least one data source, and creating a control in the particular search interface for selecting from the specific values or objects a particular value or object to enter as the query value input for the particular search interface field.

* * * * *